(12) United States Patent
Zussman

(10) Patent No.: US 9,179,279 B2
(45) Date of Patent: Nov. 3, 2015

(54) METHOD AND DEVICE FOR IDENTIFYING THE LOCATION OF AN INDOOR MOBILE TELEPHONE USER

(75) Inventor: Mordechai Zussman, Tel Aviv (IL)

(73) Assignee: ALVARION LTD. (IL)

( * ) Notice: Subject to any disclaimer, the term of this patent is extended or adjusted under 35 U.S.C. 154(b) by 531 days.

(21) Appl. No.: 13/133,897

(22) PCT Filed: Oct. 29, 2009

(86) PCT No.: PCT/IL2009/001007
§ 371 (c)(1),
(2), (4) Date: Jun. 9, 2011

(87) PCT Pub. No.: WO2010/067348
PCT Pub. Date: Jun. 17, 2010

(65) Prior Publication Data
US 2011/0250864 A1      Oct. 13, 2011

(30) Foreign Application Priority Data

Dec. 10, 2008 (IL) .......................................... 195847

(51) Int. Cl.
*H04M 11/04* (2006.01)
*H04W 4/22* (2009.01)
*G08B 25/01* (2006.01)
*G08B 25/08* (2006.01)
*H04W 76/00* (2009.01)
*H04M 1/725* (2006.01)
*H04W 64/00* (2009.01)
*H04W 84/12* (2009.01)
*H04W 84/18* (2009.01)

(52) U.S. Cl.
CPC ............... *H04W 4/22* (2013.01); *G08B 25/016* (2013.01); *G08B 25/08* (2013.01); *H04W 76/007* (2013.01); *H04M 1/7253* (2013.01); *H04M 1/72536* (2013.01); *H04M 2250/02* (2013.01); *H04M 2250/06* (2013.01); *H04W 64/00* (2013.01); *H04W 84/12* (2013.01); *H04W 84/18* (2013.01)

(58) Field of Classification Search
CPC ......... H04W 8/005; H04W 8/02; H04W 8/04; H04W 8/06; H04W 4/02
USPC ........... 455/404.1, 404.2, 456.1, 456.2, 456.3
See application file for complete search history.

(56) References Cited

U.S. PATENT DOCUMENTS

| | | | |
|---|---|---|---|
| 5,933,778 A * | 8/1999 | Buhrmann et al. | 455/461 |
| 7,260,186 B2 * | 8/2007 | Zhu et al. | 379/45 |
| 7,623,447 B1 * | 11/2009 | Faccin et al. | 370/230 |
| 2005/0063416 A1 * | 3/2005 | Shin et al. | 370/465 |
| 2005/0143091 A1 * | 6/2005 | Shapira et al. | 455/456.1 |
| 2005/0197097 A1 * | 9/2005 | Mohler | 455/404.2 |
| 2006/0252408 A1 * | 11/2006 | Faccin et al. | 455/404.2 |
| 2007/0136412 A1 * | 6/2007 | Oba et al. | 709/200 |
| 2008/0153480 A1 * | 6/2008 | Jiang | 455/426.1 |
| 2009/0252067 A1 * | 10/2009 | McGary | 370/259 |
| 2009/0291663 A1 * | 11/2009 | Schultz et al. | 455/404.2 |
| 2010/0093306 A1 * | 4/2010 | Hwang et al. | 455/404.2 |
| 2011/0267986 A1 * | 11/2011 | Grabelsky et al. | 370/259 |

* cited by examiner

*Primary Examiner* — Dai A Phuong
(74) *Attorney, Agent, or Firm* — Hershkovitz & Associates, PLLC; Abe Hershkovitz

(57) ABSTRACT

A method is provided for activating a transmission means comprised in a mobile device to operate in a manner compatible with at least one wireless communication protocol such as a Bluetooth or Wi-Fi standard. The activation of this transmission means is carried out in response to receiving a predefined indication at that mobile device denoting that an emergency communication is to be forwarded to an emergency center.

11 Claims, 2 Drawing Sheets

METHOD AND DEVICE FOR IDENTIFYING THE LOCATION OF AN INDOOR MOBILE TELEPHONE USER

FIELD OF THE INVENTION

The present invention relates to the provisioning of emergency services, and in particular, to a system, device and method for detecting the location of user who initiated an In-Doors emergency call.

BACKGROUND OF THE INVENTION

Today, when an emergency call is placed from a landline telephone, the address of the landline telephone is automatically displayed at the emergency center or at the Public Safety Answering Point (hereinafter "PSAP") operator's screen. However, when such a call is placed from a cellular telephone, the caller's location is not shown on the operator's screen, and the caller must identify his/her location to the operator, otherwise, the location at which the call was initiated is not passed along to the operator. In other cases, even though the caller is able to communicate with the emergency center operator, still, he/she may be unable to provide the operator with his/her current location. Accordingly, all cell phone users are at a disadvantage when contacting emergency operators as compared with those who place such a call from a landline telephone. This is not a problem to be taken lightly particularly with the ever growing number of people using their mobile telephones as their first and foremost means of communication.

In a NENA (National Emergency Number Association) i3 Technical Requirements Document (TRD), NENA 08-751, Issue 1, Sep. 28, 2006, the routing of calls to the correct PSAP is based upon the location of the caller known at the time of the call. The main reason being that many people when calling the emergency line for any of a number of reasons do not provide (or unable to provide) to the PSAP operator their exact location, a fact that adds an undue delay while making an attempt to trace the caller.

The US Federal Communications Commission (FCC) requires that cell phone carriers must automatically provide the location of 911 calls made from a cell phone to PSAPs within certain accuracy parameters (specifically, within 50 meters 67% of the time and within 100 meters 95% of the time). The FCC has raised additional requirements with respect to providing precise location data for a 911 call made from inside a building, structure or facility as failure to provide precise location data of the caller may place him/her life in jeopardy. For example, upon responding to a 911 call based upon GPS location data, one might still have to search dozens or even hundreds of apartments or offices before being able to locate the 911 caller.

In order to find the location of a mobile device caller who placed an emergency 911 call, the PSAP operator retrieves data from the mobile network, and from the retrieved data one may be informed which base station serves that mobile device. However, since a base station coverage in urban areas extends to a radius of up to about 500 meters to 1 km away from the base station, it might still be difficult and sometimes even impossible to locate the caller within the accuracy required. In order to overcome this problem several attempts have been made while using Global Positioning Signal ("GPS") or Time Distance of Arrival ("TDOA") between base stations to provide location data. Other proposed systems rely on the employment of triangulation methods to locate the device by comparing signal strength and/or angle-of-arrival information from multiple antennas.

However, all these solutions are able to provide only limited answer to the problem of providing accurate location data and particularly in urban areas, and do not solve the problem when the cell phones are used in establishments such as hotels, apartment and office buildings, factories, schools and the like.

Furthermore, even when an emergency call is made from a landline telephone in an office that is connected via a Private Branch eXchange ("PBX"), then typically, only the street address appears at the operator's screen. The operator would therefore only know the residential address from which the call was placed but not the exact apartment/office/room where it was made, unless the caller is able to speak with the responding operator and to provide the missing information.

Following are a number of examples of solutions that are known in the art.

US2002005804 discloses a system for determining the location of a mobile station in a cellular communications network. The solution disclosed, relies on a plurality of locator units fixedly positioned for tracking and measuring communications between a base station and a mobile station initiating an emergency communication. Each such locator unit comprises a receiving means for monitoring a control channel of the base station in order to detect and receive identifying information including a voice channel assigned for the particular mobile device initiating the emergency communication.

U.S. Pat. No. 7,260,186 describes an emergency 911 voice-over-IP (VoIP) solution. The 911 call is initiated from a mobile VoIP device and routed directly to the correct PSAP via dedicated trunks, together with correct location information and call-back number. VoIP gateways are implemented locally, accept VoIP packetized data inbound, and convert it into standard landline voice call. The call is then routed to an IP address at the VoIP gateway, which then egresses the call to a voice port at a selective router. The location of the VoIP is validated using HTTP based protocol by pushing location information to a VoIP location server, and comparing it against a geographic location database to confirm that a contained street address is valid.

U.S. 20070004379 describes a method for providing location data to a 911 operator of a cell phone caller who initiated a 911 call. When a cellular 911 call is made within proximity of a landline telephone or a stand-alone unit, an interaction takes place between the enabled cell phone and the landline telephone. Upon receiving and decoding the cellular transmission, the landline telephone or stand-alone unit transmits a 911 call which provides more precise location data to a 911 operator than if the 911 call was simply connected to the operator from the cell phone.

U.S. Pat. No. 7,315,735 discloses a location detection system for locating a mobile device placing an emergency 911 call within a facility having a distributed antenna system. The location detection system includes detection units located within the distributed antenna system where each detection unit monitors a dedicated emergency 911 channel for activity and alerts a monitor unit if activity is detected. The monitor unit determines the location of the antenna receiving the emergency 911 call based upon the identity of the detection unit.

Due to the difficulties associated with providing 911 operators with precise location data from cell phones and office phones in the circumstances described above, it is required to provide a system, device and method for providing more precise location data to an emergency center operator without requiring the caller to verbally communicate location data to the operator.

Notwithstanding the above, one other problem associated with placing a call to an emergency center from a mobile device, and particularly in crowded urban areas such as hotels, office towers and the like, is the availability of a communication path for the caller to place that call. When a caller wishes to place such an emergency call in such areas, he/she could very well find himself/herself in a situation where there is no available link to reach the cellular network for placing the call. This will be the typical case if the caller is for example in a hotel when a fire, terrorist attack and the like takes place. In any of these cases most of the people present at that location would try to use their cellular telephones, and consequently the base station servicing that area will be unable to cope with the congestion.

Therefore, there is a need for reliable method and means to allow identifying the location of a mobile device caller who places a call to the emergency service where the caller is located in a room of a multi-tenant complex such as an office building or hotel, and the like.

SUMMARY OF THE INVENTION

It is an object of the present invention to provide a method and device to allow forwarding location information to an emergency center of a person located in a multi-tenant building.

It is another object of the present invention to provide a method and device that allow automatic switching of a mobile device to operate under a Bluetooth operating mode.

Other objects of the invention will become apparent as the description of the invention proceeds.

According to a first embodiment of the present invention, there is provided a method for activating a transmission means comprised in a mobile device and operative in accordance with at least one wireless communication protocol for exchanging data over short distances, wherein the activation of the transmission means is carried out in response to receiving a pre-defined indication at the mobile device that an emergency communication (e.g. message, voice call, etc.) is to be forwarded to an emergency center. Preferably, the at least one wireless communication protocol for exchanging data over short distances is selected from among Bluetooth protocol and/or Wi-Fi protocol.

According to another embodiment of this aspect of the invention, the indication is forwarded by a unit external to the mobile device (e.g. an indoor termination unit of a Distributed Antenna System (hereinafter: "DAS") network. Such a Distributed Antenna System, or DAS, is a network of spatially separated antenna nodes connected to a common source via a transport medium that provides wireless service within a geographic area or structure. Preferably, the down link traffic conveyed from the termination unit in the downlink direction (i.e. not the towards the direction of the mobile device) is conveyed along a non wireless link such as a CATV line, a wire line, coaxial line, Fiber Optic line, etc.

In accordance with another embodiment of the present invention, the indication is generated by pressing one or more pre-defined keys of the mobile device. For example, pressing the digits 9-1-1 with or without pressing the "send" key thereafter. For the latter option, in order to prevent unwanted cases where the emergency number is simply part of a number that the caller wishes to dial, preferably, at least one rule is set to differentiate between the cases. For example, if no other keys are pressed prior to pressing the keys comprised in the emergency number and/or a pre-defined period of time has lapsed prior to pressing these keys during which no other keys were pressed and/or a pre-defined period of time has lapsed the proceeds the caller's pressing these digits during which no other digits were pressed, etc.

By yet another embodiment of the invention there is provided a method for forwarding information regarding the location of a mobile device of a user located within a multi-tenant building who wishes to contact an emergency center via a DAS network. The method comprises the steps of:

activating automatically transmission means comprised in the mobile device to operate compatibly with a Bluetooth standard or WiFi standard, thereby enabling the mobile device to transmit data in accordance with at least one wireless communication protocol for exchanging data over short distances (but preferably without interfering with the normal operation of the mobile device);

forwarding by the mobile device a signal at a designated frequency associated with the at least one wireless communication protocol for exchanging data over short distances, indicating that the user wishes to contact an emergency center;

receiving the forwarded signal at an indoor termination unit of the DAS network; and forwarding an emergency message along the DAS network towards an emergency center (e.g. PSAP) and wherein the emergency message comprises an indication of the location of the DAS network indoor termination unit. Such indication may include an ID of the DAS network indoor termination unit, and/or more detailed information such as a street address and a room number where the indoor termination unit is currently located.

The term "mobile device" as used herein throughout the specification and claims should be understood to encompass a cellular telephone, a portable computer, and a personal digital assistance (PDA).

The term "multi-tenant building" as used herein throughout the specification and claims should be understood to be any building with a large number of rooms in which people may stay for any period of time. Examples for such a multi-tenant building are: hotels, apartment and office buildings, factories, schools and the like.

According to another embodiment of the invention, the method provided further comprising a step of matching details comprised in the emergency message with a corresponding voice call being held between the user and the operator at the emergency center and wherein the communication path along which the voice call is being conveyed to the emergency center is at least partially different from the communication path along which the emergency message was conveyed to the emergency center.

In accordance with yet another embodiment of the invention, the method provided further comprises a step of conveying an emergency message towards a pre-defined communication address at the multi-tenant building in addition to carrying out the step of forwarding the emergency message along the DAS network towards the emergency center.

According to another aspect of the invention there is provided a mobile device comprising a transmission means capable of operating in accordance with at least one wireless communication protocol for exchanging data over short distances, characterized in that the transmission means is automatically activated in a manner compatible with the at least one wireless communication protocol for exchanging data over short distance upon receiving an indication to commence operation under the appropriate mode that has been generated either externally to the mobile device by an external device or internally within the mobile device, by pressing one or more pre-defined keys thereof (e.g. the pre-defined emergency center number), that an emergency communication is to be forwarded to an emergency center. In the case that the transmission means is able to communicate according to more than one wireless communication protocol for exchanging data over short distance, the transmission means is further adapted to check communication capabilities of an indoor termination unit currently located at the vicinity of the mobile device, before being automatically activated in a manner compatible with the wireless communication protocol for exchanging data over short distance which is supported by that indoor termination unit.

According to another preferred embodiment of the invention, the transmission means of the mobile device is capable of forwarding a signal at a designated frequency of the at least one wireless communication protocol for exchanging data over short distances, indicating that the user of the mobile device wishes to contact an emergency center.

In accordance with still another embodiment of the invention there is provided an indoor termination unit of a DAS network which comprises:

receiving means operative to receive a signal transmitted by a mobile device operative in accordance with the Bluetooth standard;

forwarding means operative to forward an emergency message along the DAS network towards an emergency center (e.g. a PSAP) wherein the emergency message comprises an indication of the location of the DAS network indoor termination unit.

As will be appreciated by those skilled in the art, the combination of such an indoor termination unit which comprises an active Bluetooth and/or Wi-Fi device (or a Bluetooth and/or Wi-Fi device which may be activated when required) with one or more mobile devices is regarded as a system which may preferably be used for forwarding information regarding the location of a mobile device of a user located within a multi-tenant building who contacts an emergency center via any type of applicable communication network such as CATV networks, ADSL landline networks, IP networks and the like.

Furthermore, as will be appreciated by those skilled in the art the above described devices and system of the present invention may support any applicable cellular technology such as UMTS, LTE, HSPA, GSM, CDMA, PCS, IDEN, EVDO, and the like as well as WiMax and Wibro technologies, and therefore should not be considered as being limited to any of these technologies.

By yet another aspect of the invention there is provided a communication system comprising at least one indoor termination unit of a DAS network, wherein the at least one indoor termination unit comprises:

receiving means operative to receive a signal transmitted by a mobile device operative in accordance with at least one wireless communication protocol for exchanging data over short distance;

forwarding means operative to forward an emergency message along the DAS network towards an emergency center (e.g. a PSAP) wherein the emergency message comprises an indication of the location of the DAS network indoor termination unit.

BRIEF DESCRIPTION OF THE DRAWING

For a more complete understanding of the present invention, reference is made to the following detailed description taken in conjunction with the accompanying drawings wherein.

DETAILED DESCRIPTION OF THE INVENTION

Figure 1:
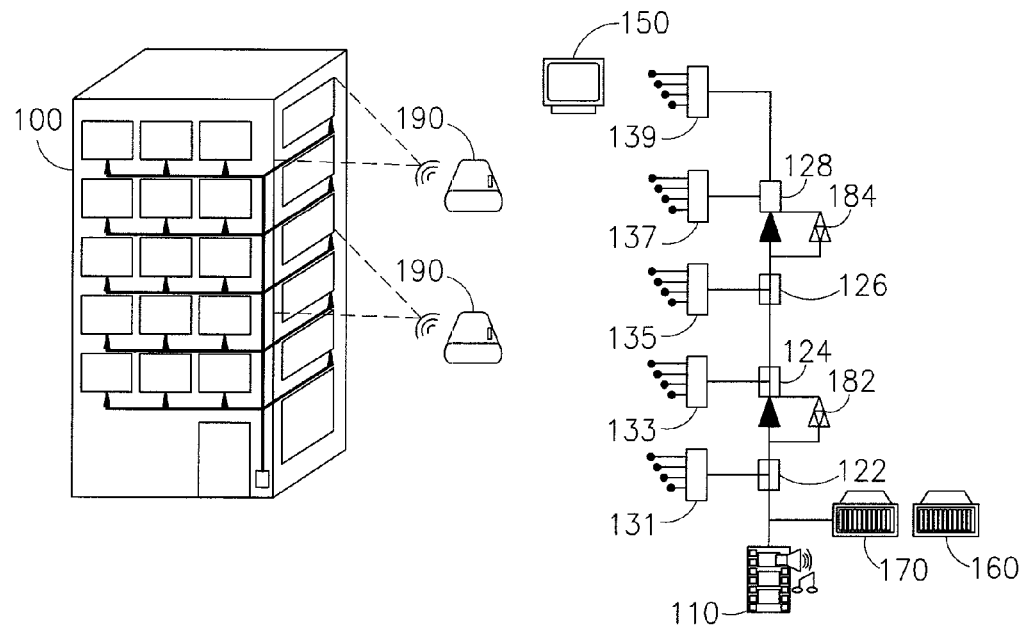
FIG. 1 presents a schematic view of a DAS system of the present invention installed in a multi tenant building.

The following are examples that demonstrate certain embodiments for carrying out the present invention.

Let us first consider a case where a guest is located in his hotel room, in which a DAS network indoor termination unit is installed.

U.S. Pat. No. 7,403,742 to the same applicant describes in details certain embodiments of an indoor termination unit that is operative for providing cellular service in multiple bands by merging DAS networks into mobile radio networks to provide improved voice & data services and coverage, while enhancing network capacity, to providing in-building access for mobile radio terminals to a mobile radio network and for carrying out any combination of mobile radio signals on a DAS system, without interfering with each other. In order to simplify the present description the details provided in U.S. Pat. No. 7,403,742 are not repeated, and U.S. Pat. No. 7,403,742 is incorporated herein by reference.

Furthermore, it should be understood that although certain DAS systems are referred to herein, the present application should be understood to encompass any type of applicable active DAS systems.

In addition, WO 2009/002938, also to the same applicant, describes in details certain embodiments of an indoor termination unit operative for providing WiMax services by merging DAS networks into WiMax radio networks, thereby providing improved voice & data services and coverage, while enhancing network capacity, which in turn enables providing in-building access to a WiMax radio network (for WiMax radio terminals) while carrying out any combination of WiMax radio signals on a DAS system, without interfering with each other. In order to simplify the present description, the details provided in WO 2009/002938 are not repeated herein, and WO 2009/002938 is hereby incorporated herein by reference.

As was previously explained, one of the aspects of the present invention is a method and devices that allow a caller who uses a mobile device such as a cellular telephone, to place a call to an emergency center (e.g. a 9-1-1 call in the USA) and to do so in a reliable manner, while allowing the operator at the emergency center to identify the current location of the caller even though the latter is in a multi-tenant building. The system used in the present example, utilizes dedicated coaxial cables (but naturally any other means to distribute the cellular signals over DAS systems may be used). One of the alternatives as described in '742 is to use existing CATV in buildings coax cables infrastructure, used to distribute TV signals and internet within the building, in order to distribute the cellular signals over the CATV network.

Standard cable infrastructure uses frequency bands of 5-860 MHz. Most of the elements of the network are able to pass frequencies of up-to 1200 MHz, and the system provided, as described in US '742, conveys the wireless signals over the CATV network preferably within the frequency band of 960-1155 MHz. The indoor termination unit may serve one room or more (e.g. two adjacent rooms) so that the identification tolerance for the caller's location may be within one room. The system may either be seamlessly integrated into an existing cable TV infrastructure or alternatively new infrastructure can be constructed using cable TV components which are low cost and easy to install.

Let us now consider FIG. 1 which illustrates a system (100) installed according to an embodiment of the present invention in a multi tenant building such as an office building, hotel building, a campus and the like. The TV signals of such a system are delivered from a TV source (110), which can be a terrestrial antenna, CATV, a satellite dish/receiver, or a VOD/PPV system and the like, to TV outlets within the building (150). In order to compensate for losses in the coaxial cables, a set of amplifiers (112 and 114) may be installed at various locations throughout the network to increase the signal gain. The signal is distributed to branches using taps (122, 124, 126 and 128) and to outlets using power dividers (131, 133, 135, 137 and 139). Cellular equipment (160) is installed at the Head end equipment (170). The cellular equipment may be a macrocell, microcell, picocell, femtocell or a wireless repeater. The wireless signal reaches the Cable/Cellular Head end equipment (170) which is adapted to aggregate wireless services signals, convert them into the correct frequency range and then combine them onto the coaxial network. Since the frequencies of the wireless broadcast transmitted along the cables are above the TV signal frequencies, there is no interference between the two types of signals. The combined signal is propagated along the coaxial network down to the TV outlets. In order to overcome the frequency limitation of the cable amplifier, bypass circuits (182 and 184) are used to separate the wireless signal, amplify it and then recombine the frequencies. At the end user's TV outlet, a small indoor termination unit (a CPE) is installed (190). The unit is operative to transmit wireless signals indoors at their original licensed frequency and also to communicate with the mobile device of the person located at the unit's vicinity by using Bluetooth and/or WiFi type of communications for 911 service, preferably in order to enable conveying the location of that person to an emergency center.

Figure 2:
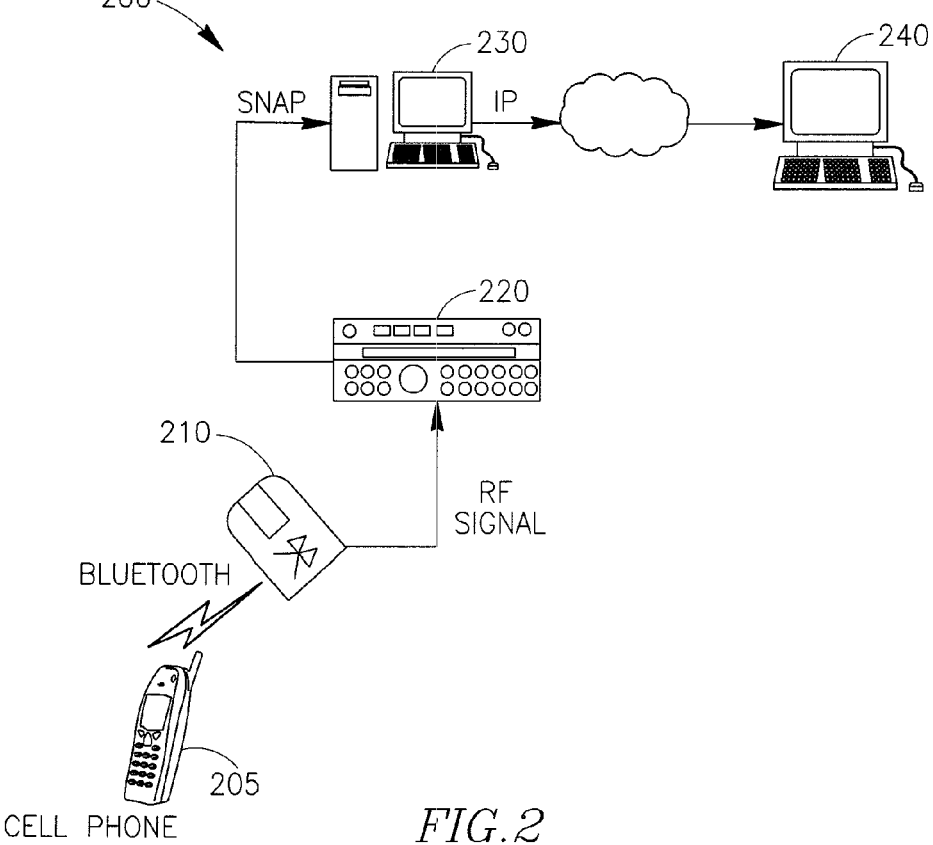
FIG. 2 illustrates a schematic configuration of an add on system using the DAS system for transmitting an emergency call.

FIG. 2 illustrates the system 200 for conveying the emergency messages according to the present invention from the mobile device (e.g. a cell phone) 205 up to the PSAP (240).

When the user of the mobile device, who is located in one of the rooms of the multi-tenant building, wishes to place a 911 call, then upon dialing the 911 number, the processor of the mobile device identifies this combination as a triggering event for activating transmission means comprised in the mobile device in a manner that is compatible with the Bluetooth and/or WiFi standard. Once this mobile transmission means is activated, an indication is passed wirelessly at the Bluetooth and/or WiFi frequency to the indoor termination unit, and is then forwarded in a manner that will be further explained. As previously explained, the Bluetooth and/or WiFi transmitter may be automatically activated in response to the user of the mobile device pressing any combination of a pre-defined emergency center number such as the 9-1-1 keys followed by the "send" key in that order or by pressing only the 9-1-1 keys and complying with other pre-defined conditions e.g. that no other keys are pressed within a pre-defined period of time, etc.

In addition to indicating the fact that the person wishes to call an emergency center, the mobile device preferably transmits in an automatic way and at the Bluetooth and/or WiFi frequency some additional information to the Bluetooth and/or WiFi receiver of the indoor termination unit. This information may include any one or more of the following details:

(a) The IMSI (International Mobile Subscriber Identity) number of the mobile device
(b) Date & Time of the call; and
(c) Identification of the Wireless Carrier/Service Provider.

Indoor termination unit (210) immediately forwards the emergency message as an Interrupt Message (i.e. a message of the highest priority) to the Coax Cable Distribution ("CCD") device (220), using any binary communication protocol preferably SubNetwork Access Protocol ("SNAP"). A CCD device can support a number of Utility Data Centers ("UDC"s), in the system of the present example up-to 8 UDCs. It combines the RF inputs and outputs of several UDCs into a single coaxial connection. The CCD also provides a reference clock for all UDCs by providing them with an accurate 10 MHz clock signal. Through the CCD the system monitoring signals are sent to the network elements.

The indoor termination unit (210) adds its own ID to the message, so that the message that is now being forwarded to CCD 220 includes the following details:

(a) 9-1-1 Number is dialed/sent;
(b) IMSI number of the mobile device ;
(c) Date & Time of the call;
(d) Identification of the wireless Carrier/Service Provider; and
(e) ID of the indoor termination unit.

Next, the CCD transmits the massage to a gateway device (230), preferably also by using the SNAP communication application. The gateway device is may be a local device or web driven. According to an embodiment of the invention, the gateway device (230) also transmits the message received from indoor termination device 201 to one or more pre-defined addresses in the system in order to initiate further activities. Such addresses may be a terminal at the security office of the building (e.g. the hotel security officer) who may reach the caller's room well before the emergency services will, or an address to enable initiating further actions. For example, if a number of emergency calls were made and the corresponding indoor termination units associated with these calls are all located at the same vicinity, indicating an event such a fire etc., the action that would be taken may be stopping the nearby elevators, etc.

The gateway device (230) aggregates the input from the monitoring & control systems. It is also capable of remotely configuring the indoor termination unit operating frequencies, turning indoor termination units on/off and monitoring various parameters thereof. The gateway software residing on a PC is connected though SNAP to all indoor termination units included in the system. Preferably, gateway device (230) comprises a dedicated screen to display all emergency alerts. The display is based on the emergency message arriving the CCD, with the addition of the indoor termination unit location (& residential address), based on the gateway database. The display preferably contains the following information:

(a) 9-1-1 Number is dialed/sent;
(b) IMSI Number of the mobile device;
(c) Date & Time of the call;
(d) Identification of the Wireless Carrier/Service Provider;
(e) Indoor termination unit ID;
(f) Residential Address (& Hotel Name); and
(g) Indoor termination unit location (Room Number)

Next, the message is conveyed from gateway device (230) towards PSAP (250). The message will be conveyed by using any media known in the art per se such as IP network, PSTN trunks, etc.

When the PSAP operator eventually receives the message he/she will have all the necessary information to enable reaching the caller as soon as possible.

Figure 3:
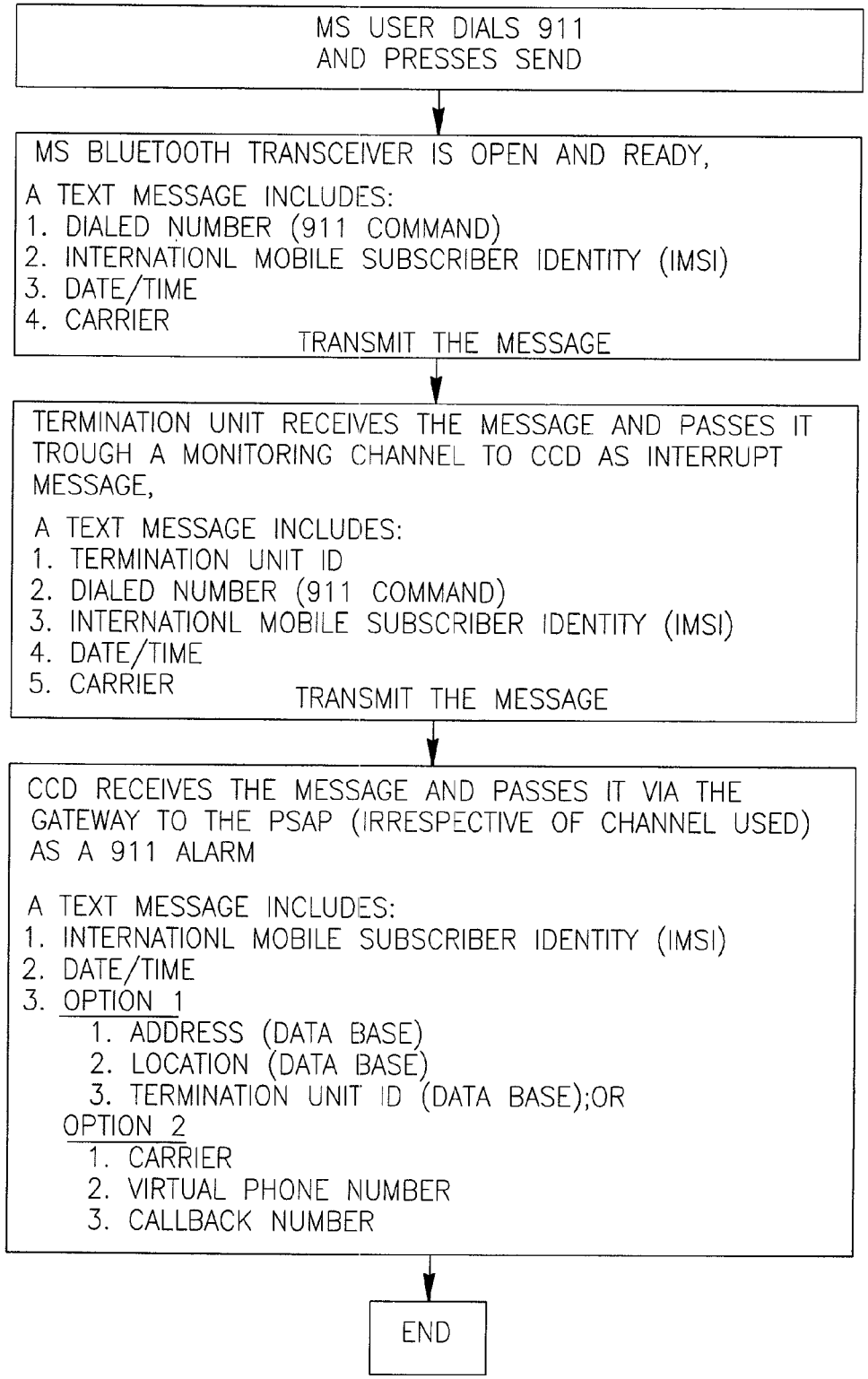
FIG. 3 exemplifies an algorithm for finding the location of a 911 cellular phone caller trough a DAS network.

A summary of the flow chart described above is demonstrated in FIG. 3.

The description of the above embodiments relates primarily to the identification of the precise location (within a room distance or so) of the caller to the emergency center. However, as will be appreciated by those skilled in the art, it could very well be that the caller places a voice call to the emergency center, in which case the information derived from the indoor termination unit (e.g. its Location and the mobile device number) shall be forwarded to the emergency center typically along a path different from a path along which the voice call is forwarded (e.g. the path for conveying the emergency message from the indoor termination unit may extend along an IP network, SS7 network, etc.). At the emergency center, according to the present invention, the information provided is matched with the voice call e.g. through the mobile device number, and the emergency center operator receives the caller location information while the voice call is still taking place.

According to an embodiment of the present invention, when the emergency alert (the 9-1-1 Alert) is received from more than one indoor termination unit, each of the indoor termination units will forward the emergency message as described above, independent of the other message being conveyed at the same time by the other indoor termination units, and the gateway device is operative to receive such multiple entries and to display them accordingly.

It is to be understood that the above description only includes some embodiments of the invention and serves for its illustration. Numerous other ways of carrying out the methods provided by the present invention may be construed by a person skilled in the art without departing from the scope of the invention, and are thus encompassed by the present invention.

For example, it should be clear to any person skilled in the art that the functionalities required to carry out the present invention may be achieved by dividing them differently between the various devices belonging to the DAS network, etc. It should be understood that any such shifting a functionality from one device to another and vice versa, is a matter of simple selection and can be done without departing from the scope of the present invention.

The invention claimed is:

1. A communication system including
a termination unit;
a mobile device configured to perform the following steps:
   receive an indication of an emergency from a user; and
   in response to receiving the indication of the emergency, transmit a first message to the termination unit, wherein the first message is transmitted wirelessly using a local wireless transmission protocol,
   wherein the termination unit is part of a DAS (Distributed Antenna System) network,
   wherein the DAS includes a non-wireless internal communication system,
   wherein the termination unit is configured to perform the following steps:
      receive the first message from the mobile device;
      in response to receiving the first message, transmit a second message to a local distribution device;
      wherein the second message includes: an identification of the termination unit, the emergency command, the IMSI (International Mobile Subscriber Identity) of the mobile device, the current date and time, and the identification of a cellular communication carrier associated with the mobile device, and
a distribution device configured to perform the following steps:
   receive the second message; and
   in response to receiving the second message, sending a third message to a PSAP (Public Safety Answering Point) via a gateway device,
   wherein the third message includes the identification of the termination unit, the emergency command, the IMSI (International Mobile Subscriber Identity) of the mobile device, the current date and time, and the identification of a cellular communication carrier associated with the mobile device,
   wherein the third message includes a physical location of the termination unit, wherein the physical location of the termination unit includes a physical location in a multi-tenant building, and wherein the physical location in the multi-tenant building includes one of: an apartment identification and a room identification,
   wherein the distribution device is part of the DAS (Distributed Antenna System) and is further configured to perform the following additional step:
      receive an additional message from an additional termination unit,
      wherein the additional message includes an additional physical location of the additional termination unit, wherein the additional physical location of the additional termination unit includes an additional physical location in the multi-tenant building, and
      wherein the additional physical location in the multi-tenant building includes one of: an additional apartment identification and an additional room identification.

2. The communication system of claim 1, further comprising a gateway device configured to perform the following steps:
receive the third message from the distribution device; and
send the third message to the PSAP.

3. The communication system of claim 2, wherein the gateway device is further configured to send the third message to the PSAP as an emergency alarm.

4. The communication system of claim 2, wherein the gateway device is further configured to send a copy of the third message to an additional pre-defined address.

5. The communication system of claim 4, wherein the additional pre-defined address is associated with local security.

6. The communication system of claim 5, wherein the communication system further includes a security system configured to perform the following steps:
receive the copy of the third message; and
initiate a further activity upon receipt of the third message.

7. The communication system of claim 6, wherein the security system is further configured to:
determine whether multiple messages have been received that include physical locations in a single vicinity; and
upon a determination that the received multiple messages include the physical locations in the single vicinity, initiate the further activity, wherein the further activity is associated with the single vicinity.

8. The communication system of claim 7, wherein the further activity includes stopping at least one elevator near the single vicinity.

9. The communication system of claim 1, further comprising a PSAP configured to perform the following steps:
  receive the third message including one of the apartment identification and the room identification;
  search for a separate message received over a cellular communication system from the mobile device; and
  associate the third message with the separate message, such that the separate message is associated with one of the apartment identification and the room identification.

10. The communication system of claim 1, wherein the non-wireless internal communication system includes at least one of: a cable television (CATV) line, a wire line, and a fiber optic line.

11. The communication system of claim 10, wherein the non-wireless internal communication system is a cable television (CATV) network, the CATV network comprising:
  a cellular entrance module (CEEM) at an access point of the CATV network, receiving original downlink signals, including downlink signals from a plurality of base transceiver stations (BTS), and shifting the original downlink signals to a frequency band higher than television signals of the CATV network to provide shifted cellular signals, including at least shifted first downlink signals of a first BTS and shifted second downlink signals of a second BTS, the CEEM having a frequency converter for each BTS providing frequency conversion in accordance with a predetermined frequency plan into predetermined sub-bands of said frequency band;
  a cable mount cellular antenna (CMCA) at an indoor termination point of the CATV network, adapted to receive original uplink signals, including original first uplink signals and original second uplink signals, and shifting the original uplink signals to a frequency band higher than television signals of the CATV network to provide shifted cellular signals, including shifted first uplink signals and shifted second uplink signals; and
  a cellular transport module (CETM) bypassing an active component of the CATV network, and communicating the shifted cellular signals over the CATV network between the CEEM and CMCA via the CETM.

\* \* \* \* \*